(12) United States Patent
Schneider

(10) Patent No.: US 9,212,680 B2
(45) Date of Patent: Dec. 15, 2015

(54) TIE BAR FOR PURPOSES OF CONNECTING EQUIPMENT FITTING OF AN EQUIPMENT MODULE, IN PARTICULAR AN OVERHEAD COMPARTMENT, TO A STRUCTURE FITTING OF A FUSELAGE CELL STRUCTURE OF AN AERONAUTICAL VEHICLE

(71) Applicant: AIRBUS OPERATIONS GMBH, Hamburg (DE)

(72) Inventor: Uwe Schneider, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 78 days.

(21) Appl. No.: 13/654,851

(22) Filed: Oct. 18, 2012

(65) Prior Publication Data
US 2013/0129445 A1   May 23, 2013

Related U.S. Application Data

(60) Provisional application No. 61/548,250, filed on Oct. 18, 2011.

(30) Foreign Application Priority Data

Oct. 18, 2011   (DE) .......................... 10 2011 084 722

(51) Int. Cl.
| | |
|---|---|
| F16B 21/12 | (2006.01) |
| B64D 11/00 | (2006.01) |
| F16B 5/02 | (2006.01) |
| F16B 19/02 | (2006.01) |

(52) U.S. Cl.
CPC .............. *F16B 21/12* (2013.01); *B64D 11/003* (2013.01); *F16B 5/0241* (2013.01); *F16B 19/02* (2013.01)

(58) Field of Classification Search
USPC ............... 403/79, 157–159, 194, 195, 43–48, 403/221, 222, 243, 224, 226, 372; 244/118.1
See application file for complete search history.

(56) References Cited

U.S. PATENT DOCUMENTS

| | | | | | |
|---|---|---|---|---|---|
| 2,937,040 | A | * | 5/1960 | Hutton | 403/227 |
| 3,472,541 | A | * | 10/1969 | Hulten | 403/146 |
| 3,628,816 | A | * | 12/1971 | Ross, Jr. | 403/2 |
| 3,762,747 | A | * | 10/1973 | Griffen | 403/225 |
| 3,904,300 | A | * | 9/1975 | Hetmann | 403/203 |

(Continued)

FOREIGN PATENT DOCUMENTS

| | | |
|---|---|---|
| DE | 27 15 122 | 10/1978 |
| DE | 10 2005 007 130 | 8/2006 |

(Continued)

*Primary Examiner* — Joshua Kennedy
(74) *Attorney, Agent, or Firm* — Greer Burns & Crain, Ltd.

(57) ABSTRACT

A tie bar for connecting an equipment fitting of an equipment module to a structure fitting of a fuselage cell structure. At each end the tie bar has a fork head each with a fork head hole for a bolt. The spacing between the fork heads can be continuously adjusted. A captive bushing is utilized for sound and vibration decoupling. The bushings which are a press fit in the fork head holes can no longer fall out during the handling of the tie bars 10. The dimensions of the bushings made of plastic are adapted to the respective application scenario by a tolerance calculation and guarantee an effective sound and vibration decoupling between the structure fitting and the equipment fitting.

11 Claims, 3 Drawing Sheets

(56) References Cited

U.S. PATENT DOCUMENTS

| | | | |
|---|---|---|---|
| 4,361,415 A | 11/1982 | Aubry | |
| 4,766,980 A * | 8/1988 | Engle | 188/52 |
| 5,108,048 A * | 4/1992 | Chang | 244/118.1 |
| 5,595,452 A * | 1/1997 | Hill et al. | 403/221 |
| 5,599,056 A * | 2/1997 | Schmitt | 296/122 |
| 6,669,393 B2 * | 12/2003 | Schilling | 403/2 |
| 6,769,831 B2 * | 8/2004 | Aquino et al. | 403/350 |
| 7,900,873 B2 * | 3/2011 | Kulesha et al. | 244/135 R |
| 7,954,793 B2 * | 6/2011 | Weisbeck et al. | 267/292 |
| 2009/0123224 A1 * | 5/2009 | Dazet | 403/143 |
| 2012/0251224 A1 * | 10/2012 | Halcom et al. | 403/155 |

FOREIGN PATENT DOCUMENTS

| | | |
|---|---|---|
| DE | 10 2008 025 232 | 12/2009 |
| FR | 2 934 023 | 1/2010 |
| GB | 2 129 524 | 5/1984 |

\* cited by examiner

TIE BAR FOR PURPOSES OF CONNECTING EQUIPMENT FITTING OF AN EQUIPMENT MODULE, IN PARTICULAR AN OVERHEAD COMPARTMENT, TO A STRUCTURE FITTING OF A FUSELAGE CELL STRUCTURE OF AN AERONAUTICAL VEHICLE

CROSS-REFERENCES TO RELATED APPLICATIONS

This application claims priority to DE 10 2011 084 722.7 filed 18 Oct. 2011, and U.S. Provisional Application No. 61/548,250 filed 18 Oct. 2011 the entire contents of each which are hereby incorporated by reference.

BACKGROUND OF THE INVENTION

The invention concerns a tie bar for purposes of connecting an equipment fitting of an equipment module, in particular an overhead compartment, to a structure fitting of a fuselage cell structure of an aeronautical vehicle, in particular an aircraft, wherein at each end the tie bar has a fork head, in each case with two fork head holes for purposes of accommodating a bolt, and a distance between the fork heads that can be continuously adjusted.

From the prior art it is of known art to attach overhead compartments to an aircraft structure with the aid of a multiplicity of tie rods. Here a decoupling of sound and vibration between the structure fittings on the side of the aircraft and the associated fork heads on the side of the overhead compartments is absolutely essential. In today's aircraft this decoupling of vibration and sound is implemented by means of plastic spacer rings or washers.

What is disadvantageous in these tie rod attachments are the numerous individual parts, which moreover must often be assembled and installed in the fitted-out aircraft cabin in a location that is awkward for such installation tasks. The result is that a disproportionately large amount of time is spent on this task during the manual installation of equipment in the aircraft cabin, wherein at the same time there is an inherent risk of losing individual parts. In addition the de-installation of the overhead compartments is made more difficult in the event of a refurbishment or repair.

SUMMARY OF THE INVENTION

The object of the invention is therefore to minimize the number of individual parts of the tie rod attachments of previous known art, and also to eliminate the awkwardness of the installation, and the risk of losing individual parts during the installation of equipment modules.

In that the fork head holes of at least one fork head in each case have a captive bushing for purposes of sound and vibration decoupling, the bushings can no longer fall out and thereby be lost during the installation of equipment in the aircraft. At the same time, the number of individual parts to be handled is significantly reduced, since the bushings and the tie bar form one functional unit. In combination the two effects bring about a clear reduction in the working time and simplification of the installation. Moreover the search for components that have become lost in an aircraft, which is generally necessary in the interests of safety, has previously required a large amount of time. The bushings have an essentially hollow cylindrical base body with an annular flange formed in the region of one end of the bushing. The bushings are preferably designed such that they can be inserted into the fork head holes such that they latch into position, and are reliably fixed, i.e., in a captive manner, in their locations in the holes by a combination of a press fit and a form fit, in at least some regions. Alternatively the plastic bushings can also be captively secured in the fork head holes with adhesive, for example, or by means of welding, pressing, screwing, or another manner. Any laborious pre-attachment of the washers or spacer rings previously used by means of adhesive in a separate operation, so as to ease installation, and/or to ensure that items cannot be lost, is eliminated. By means of the inventive tie bars the equipment modules can be simply and conveniently installed on the structure fitting and the equipment fitting in a timesaving manner—even in installation positions that are difficult to access.

In a further development of the tie bar, provision is made that each bushing has a hollow cylindrical base body with a peripheral bead, at least in some sections.

In an interaction with the fork head hole, the bead enables a form fit in at least some regions, which in conjunction with a light press fit reliably prevents the bushing from falling out of the fork head holes.

In accordance with an advantageous further development of the tie bar, provision is made that the base bodies of the bushings in each case have at least two axial slots.

The preferably rectangular-shaped axial slots, i.e., longitudinal slots, support an inwardly directed radial deformation of the bushing as the latter is inserted into the fork head holes. The length of the axial slots is in each case smaller than, or the same as, the shank height of the base body.

In a further configuration of the tie bar, provision is made that the bead has a cross-sectional geometry with the approximate shape of a circular segment.

As a consequence of this circular segmental shape, or arcuate shape, of bead geometry the pressing in and snapping into place of the bushing into the fork head hole in question is made possible after a predefined small mechanical resistance has been overcome.

In accordance with a further development of the tie bar, each base body of the bushings in each case has a flange pointing radially outwards.

On the one hand, the flange secures the axial location of the bushing within the fork head hole in one direction, so that the bushings cannot migrate in an undefined manner in the direction of the structure fitting. On the other hand, the flange promotes improved sound and vibration decoupling, since the bolt, i.e., the means of securement, and any washer that may be present, no longer abut directly against the generally metallic fork head, but rather against the (plastic) flange.

In accordance with a further advantageous configuration of the tie bar, a bead spacing between the flanges and the beads approximately corresponds to a material thickness of the fork heads in the region of the fork head holes.

By this means a form fit is achieved, in at least some regions, between the bushings and the fork heads in the region of the fork head holes, which allows the bushings to click or snap into the fork head holes such that they are latched in position.

In a further advantageous development of the tie bar, an external diameter of the base body of the bushings is in each case at least slightly larger than an internal diameter of the fork head holes.

By this means a light press fit is obtained between the base body and the fork head hole, so that in conjunction with the form fit in at least some regions, a reliable captive seating of the bushing within the fork head holes is provided as a consequence of the bead.

In accordance with a further development of the tie bar, the bolts in the fork head holes of the fork ends are secured in their location by a means of securement, in particular a spring cotter pin.

By this means a reliable attachment of the internal module to the structure is provided under all operating conditions of the aircraft; however this can also be easily released once again when so required. The means of securement does not lie in the main load direction. An optional bolt washer can be provided underneath the spring cotter pin, in order to increase the seating surface for the spring cotter pin.

In a further development of the tie bar, provision is made that between the structure fitting and the associated fork head, and between the equipment fitting and the associated fork head, an angular displacement a of up to 5° is possible in each case.

By this means the possibility is created of compensation between the structure fittings and the equipment fittings, in particular parallel to the aircraft longitudinal axis, and moreover the integration of the internal equipment modules into the passenger cabin is simplified.

In a further development of the tie bar, provision is made that the bushings for purposes of sound and vibration decoupling are formed from a vibration-attenuating material, in particular from a thermoplastic plastic material, from a thermosetting plastic material, from a rubbery-elastic plastic material or from a combination of at least two of the plastic materials cited.

The plastic material deployed in the manufacture of the bushings enables, in addition to the particular shaping of the bushings in the injection casting method, their action in the decoupling of vibration. Through the deployment of elastomers, i.e., rubbery-elastic plastic materials, the sound and vibration decoupling effect of the bushings can be further optimized. For purposes of increasing the mechanical load capacity and the wear resistance the plastic materials in addition can be provided with fiber reinforcement. Moreover the bushing can have a rubbery-elastic core, in particular in the region of the flange and/or the base body, which in at least some regions is coated with a thermoplastic and/or thermosetting plastic material. By this means the as a rule strong vibration-attenuating action of elastomers can be combined with the high mechanical load capacity of thermoplastic and/or thermosetting plastics in an advantageous manner.

BRIEF DESCRIPTION OF THE DRAWINGS

In the drawings.

In the figures the same design elements have the same reference numbers in each case—insofar as no explicit reference is made to them.

DETAILED DESCRIPTION OF THE PREFERRED EMBODIMENTS

Figure 1:
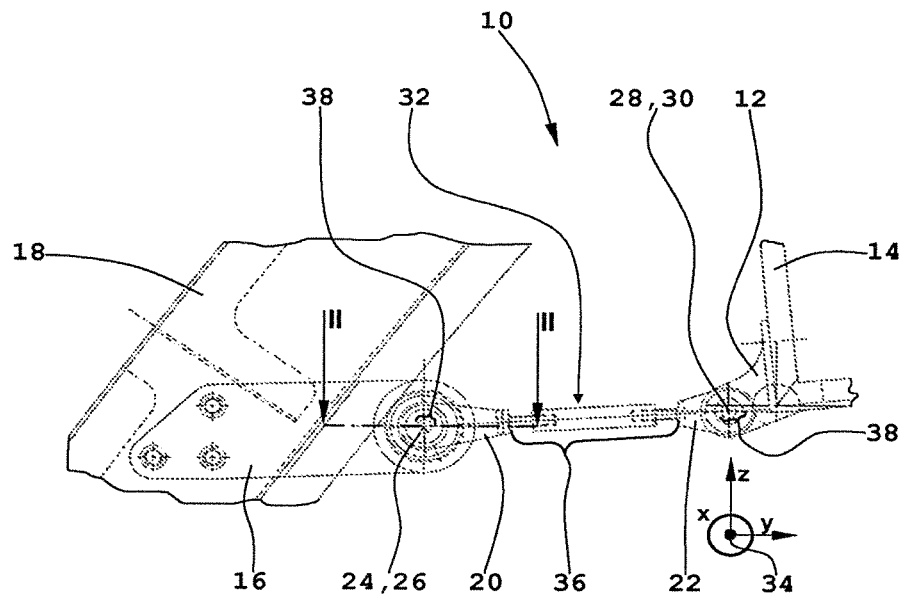
FIG. 1 shows a schematic side view of an inventive tie bar for purposes of connecting an equipment fitting to a structure fitting.

FIG. 1 shows an inventive tie bar in its installed location. By means of a tie bar 10, an equipment fitting 12 of an equipment module 14 is connected to a structure fitting 16 (a so-called "A-bracket") of a fuselage cell structure 18 of a (passenger) aircraft, not represented. Here the tie bar 10 is located in an undesignated interior space of the fuselage cell structure 18. The equipment module 14 can, for example, take the form of an overhead compartment. The tie bar comprises, amongst other features, two fork heads 20, 22 in each case with two fork head holes 24 to 30 for the respective insertion of an (attachment) bolt, not represented here. The two fork heads 20, 22 are in each case screwed into undesignated end sections of a threaded rod 32. For this purpose the threaded rod 32 features, at least at each end, an undesignated internally threaded hole, into each of which a similarly undesignated threaded bolt of a fork head 20, 22 can be screwed. A left-handed thread is introduced into the one internally threaded hole, while the other threaded hole, located at the other end, is provided with a right-handed thread.

A coordinates system 34 illustrates the location of all components in space, wherein the x-axis of the coordinates system 34 represents the longitudinal axis of the aircraft in the direction of flight, the z-axis, directed away from the ground, corresponds to the vertical axis of the aircraft, and the y-axis is equivalent to a transverse axis of the aircraft, i.e., it runs approximately parallel to the wing surfaces, or to the elevator unit. In the installed location shown an adjustment can be made to the length of the tie bar 10, i.e., to the distance 36 between the fork heads parallel to the y-axis, by rotating the threaded rod 32 about its axis relative to the fork heads 20, 22. The fork heads 20, 22 are secured against inadvertent rotation relative to the threaded rod 32 by suitable means of securement, such as, for example, lock nuts, or castellated nuts with cotter pins. An internal diameter 38 of the fork head holes 24 to 30 of the two fork heads 20, 22 is in each case dimensioned such that when the bushings are inserted their locations are captively fixed.

The fork heads 20, 22 are formed from a suitable plastic material and/or foam plastic material that attenuates as much sound and vibration as possible; this material can be provided with fiber reinforcement, as required, for purposes of improving its mechanical properties. Here thermoplastic plastics, thermosetting plastics, rubbery-elastic plastics (elastomers), or a combination of at least two of the materials cited, can find application.

Figure 2:
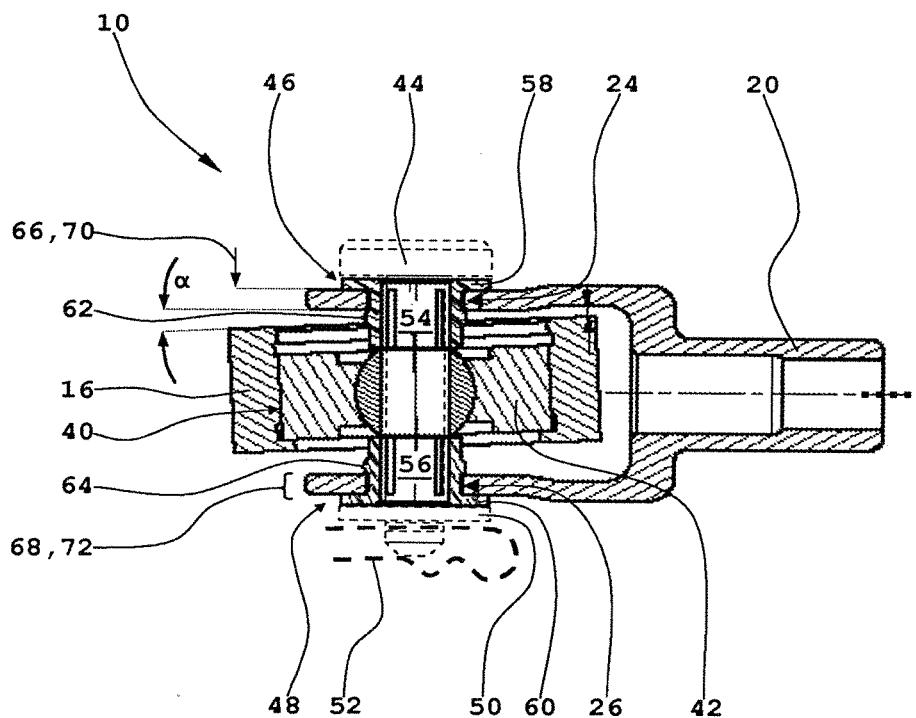
FIG. 2 shows a cross-sectional representation through the left-hand fork head of the tie bar along the line of cut II-II in FIG. 1.

FIG. 2 shows a cross-sectional representation along the line of cut II-II in FIG. 1 through the first, left-hand fork head 20, the configuration of which here follows the structural design of the right-hand fork head 22. Instead of the fork head 22 the equipment fitting 12 can also be mechanically connected to the tie bar 10 by means of another coupling element.

The structure fitting 16 features a hole 40 with a disk-shaped insert 42, in which an undesignated spherical segment, i.e., partial sphere, with a hole through the spherical segment, similarly not provided with a reference number, is accommodated such that it can swivel, for purposes of accommodating the bolt 44 indicated by a dashed line. The spherical segment is formed by the removal of two opposing spherical; sections, or spherical caps—with a height that is small compared with the full spherical diameter—from a full sphere. Amongst other features the spherical segment enables compensation for a small angular displacement a of up to 5°, for example, between the structure fitting 16 and the tie bar 10.

In accordance with the invention, a self-fixing bushing 46, 48 of a plastic material is captively latched into each of the fork head holes 24, 26, so that the number of individual parts that can fall out during installation of the tie bar 10 is significantly reduced compared with tie rod attachments of prior known art. Moreover by this means the installation of the equipment modules within the passenger cabin of the aircraft is significantly simplified. In the inserted state a combination of a light press fit together with a form fit in at least some regions, exists between the bushings 46, 48 and the fork head holes 24, 26. The bushings 46, 48 are preferably introduced into the fork head holes 24, 26 before the start of installation of the equipment in the aircraft cabin, in a separate upstream operation. The definitive connection of the fork head 22 to the structure fitting 16 takes place with the insertion of the bolt 44 into the bushings 46, 48, i.e., into the fork head holes 24, 26, and into the hole through the spherical segment. The definitive securement of the location of the bolt 44 is finally undertaken by means of an optional bolt washer 50 and, for example, a spring cotter pin 52 as a possible means of securement. For purposes of inserting the spring cotter pin 52 into the bolt 44 the latter has a transverse hole, which runs at right angles to an undesignated longitudinal axis of the bolt 44.

The bushings 46, 48 in each case have an approximately cylindrical hollow base body 54, 56, on whose outwardly directed, undesignated end an annular flange 58, 60 is attached in each case. Furthermore the base bodies 54, 56 have in each case a peripheral (annular) bead 62, 64. By virtue of the flanges 58, 60 any displacement of the bushings 46, 48 in the direction of the structure fitting is limited. Moreover the flanges 58, 60 prevent the undesignated bolt head of the bolt 44, or the optional bolt washer 50, or the spring cotter pin 52, from abutting directly against the fork head 20. A shank height, not provided here with a reference number, of the base body 54, 56, is hereby dimensioned such that undesignated ends of the base bodies 54, 56 of the bushings 46, 48, pointing away from the flanges 58, 60, in the ideal case abut directly against the spherical segment, i.e., against the partial sphere, of the structure fitting 16, and the flanges 58, 60 of the bushings 46, 48 are similarly seated against the fork head 20 in a manner that is as free of clearance as possible. By this means an optimal sound and vibration decoupling is achieved between the equipment fitting 12 and the structure fitting 16. Here the bead spacings 66, 68 of the two bushings 46, 48 approximately correspond to a material thickness 70, 72 of the two undesignated fork head arms of the fork head 20.

If an external diameter, here similarly undesignated, of the base bodies 54, 56 of the bushings 46, 48 in one application scenario is, for example, 12 mm in each case, then an internal diameter of, e.g., 11 mm in each case can be selected for the fork head holes of the tie bar 10. By this means a light press fit is produced, which in interaction with the form fit in at least some regions, as a consequence of the beads 62, 64 abutting against the inner faces of the fork head arms in the region of the fork head holes 24, 26, brings about a secure fixing of the locations of the bushings 46, 48. The necessary sound and vibration decoupling between the tie bar 10 and the structure fitting 16 is guaranteed by the defined shank height of the hollow cylindrical base body of the bushings 46, 48, which here, for example, is 8.8 mm in each case. The exact shank height of the bushings 46, 48 must be individually determined in the course of a tolerance calculation—in each case as a function of the actual installation circumstances—such that the fork head, with a bolt 44 inserted and secured by means of an optional bolt washer 50 and spring cotter pin 52, is always positioned centrally and with a sufficient spacing (freedom from contact) from the structure fitting 16.

Figure 3:
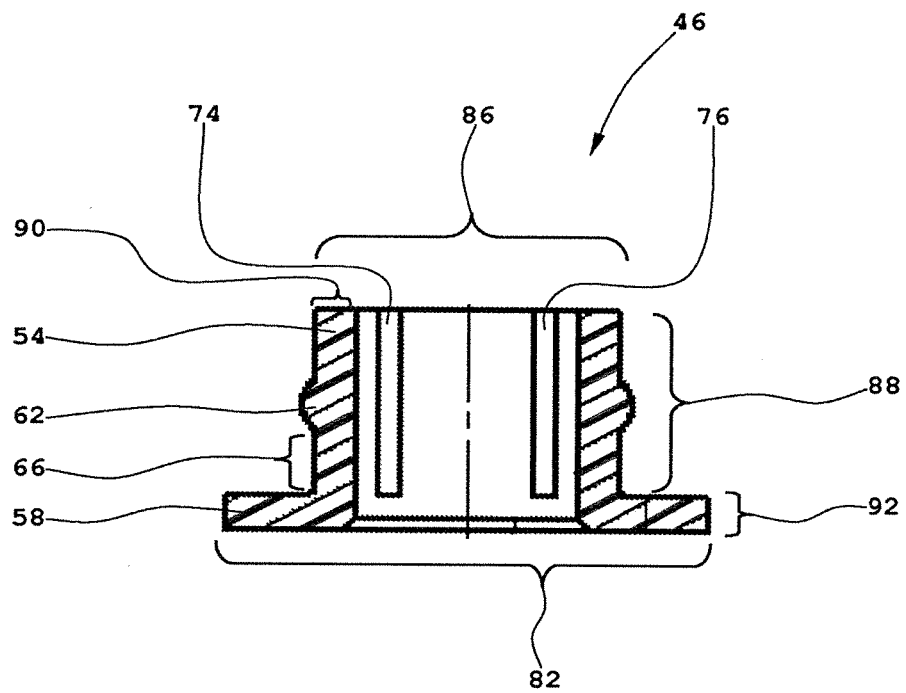
FIG. 3 shows a cross-sectional representation through a bushing for purposes of vibration decoupling.
Figure 4:
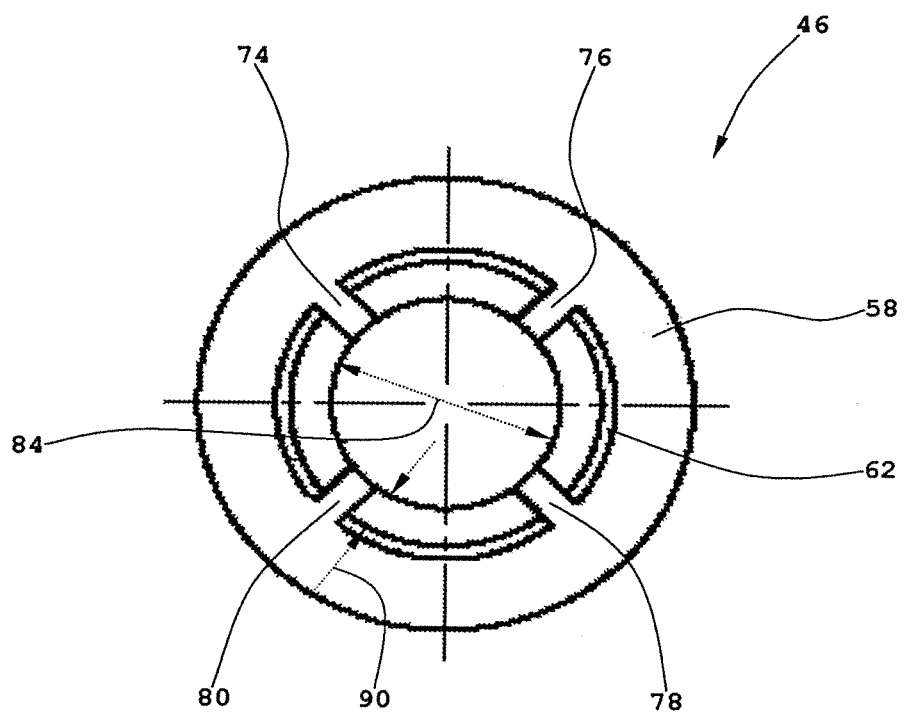
FIG. 4 shows a plan view onto the bushing according to FIG. 3.

FIGS. 3 and 4, which are referred to at the same time in the further course of the description, show a magnified cross-sectional representation through the bushing 46 in FIG. 2, together with a plan view onto the bushing 46.

In order to ease the insertion of the bushing 46 into a fork head hole, i.e. whilst enabling a predefined small resistance to be overcome, the base body 54 of the bushing 46 is fitted with a total of four axial slots 74 to 80. The maximum length of the axial slots 74 to 80 corresponds in each case to a shank height of the base body 54 of the bushing 46. The axial slots 74 to 80 ease the radially sprung pressing together of the base body 54 of the bushing 46 as the latter is inserted into a fork head hole, and are arranged in a distributed manner, as can be seen in particular from FIG. 4, evenly spaced apart from one another over the periphery of the base body 54. A flange diameter 82 is selected to be significantly larger than an undesignated internal diameter of the associated fork head holes, in order to provide a sufficiently large seating surface for the bolt, and/or for the optional bolt washer (cf. in particular FIG. 2). An internal diameter 84 of the hollow cylindrical base body 54 is dimensioned such that in the ideal case the bolt 44 can be introduced into the bushing 46 without any clearance. An external diameter 86 of the base body 54 of the bushing 46 is dimensioned such that a light press fit is preferably set between the bushing 46 and a fork head hole in the inserted state of the bushing 46. A shank height 88 of the base body 54 is designed such that the design criteria, presented in the context of the description of FIG. 2, for purposes of sound and vibration decoupling between the tie bar and the structure fitting, are fulfilled as far as possible. From the representation of FIG. 3 it can furthermore be seen that the peripheral (annular) bead 62 has a cross-sectional geometry that approximately corresponds to that of a segment of a circle, i.e. that of a segment of an arc. A material thickness 90 of the base body 54 (not including the bead 62) and a material thickness 92 of the flange 58 are preferably selected to be approximately the same size, and moreover are dimensioned such that the bushing 46 has sufficient intrinsic mechanical stability.

Figure 5:
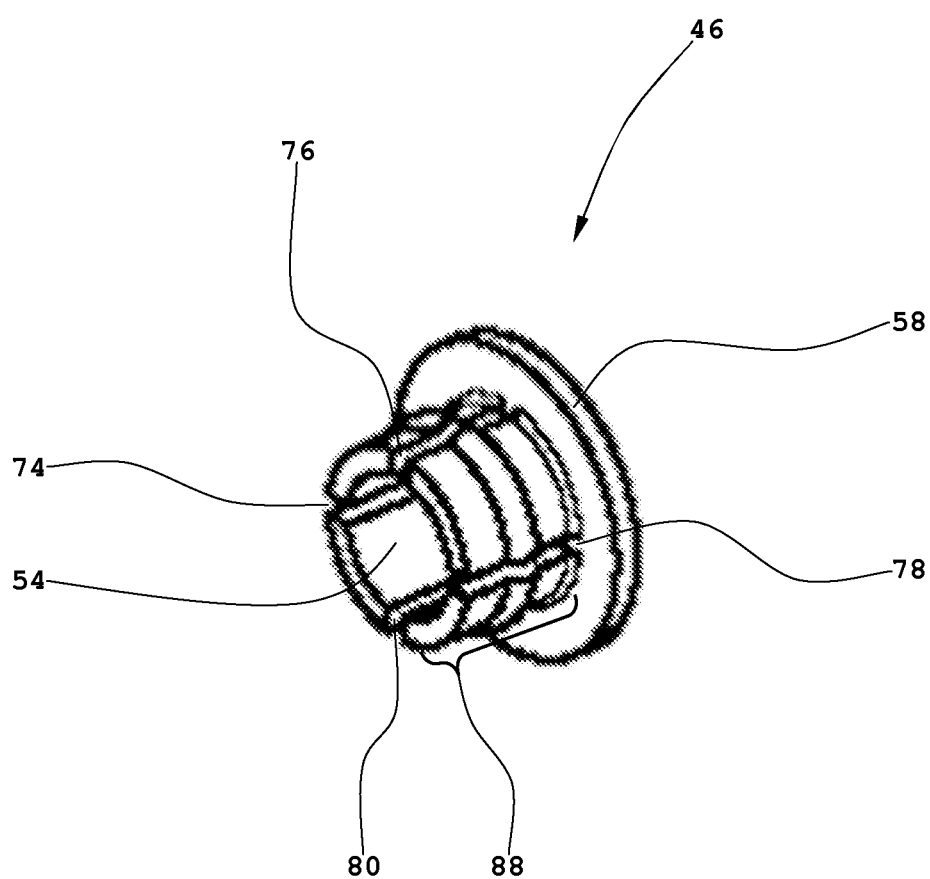
FIG. 5 shows a perspective view of the bushing for purposes of vibration decoupling.

FIG. 5 illustrates in an isometric representation the bushing 46 with the peripheral flange 58 and the four axial slots 74 to 80, which are introduced into the hollow cylindrical base body 54. In principle at least one axial slot 74 is provided in the base body 54 of the bushing 46, which extends at least partly over the shank height 88.

| Reference symbol list | |
|---|---|
| 10. | Tie bar |
| 12. | Equipment fitting |
| 14. | Equipment module |
| 16. | Structure fitting |
| 18. | Fuselage cell structure |
| 20. | (First) fork head |
| 22. | (Second) fork head |
| 24. | Fork head hole |
| 26. | Fork head hole |
| 28. | Fork head hole |
| 30. | Fork head hole |
| 32. | Threaded rod |
| 34. | Coordinates system |
| 36. | Spacing between the fork heads |
| 38 | Internal diameter (fork head holes) |
| 40. | Hole (structure fitting) |
| 42. | Insert (disk-shaped) |
| 44. | Bolt |
| 46. | Bushing |
| 48. | Bushing |
| 50. | Bolt washer |
| 52. | Spring cotter pin |
| 54. | Base body (bushing) |
| 56. | Base body (bushing) |
| 58. | Flange (bushing) |
| 60. | Flange (bushing) |
| 62. | (Annular) bead (bushing) |
| 64. | (Annular) bead (bushing) |
| 66. | Bead spacing |
| 68. | Bead spacing |

-continued

| Reference symbol list | | |
|---|---|---|
| 70. | Material thickness (fork head) | |
| 72. | Material thickness (fork head) | |
| 74. | Axial slot | |
| 76. | Axial slot | |
| 78. | Axial slot | |
| 80. | Axial slot | |
| 82. | Flange diameter | Base body |
| 84. | Internal diameter | |
| 86. | External diameter | |
| 88. | Shank height | |
| 90. | Wall thickness | |
| 92. | Material thickness (flange) | |

The invention claimed is:

1. A tie bar for purposes of connecting an equipment fitting of an equipment module to a structure fitting of a fuselage cell structure of an aeronautical vehicle, comprising:
 a fork head at each end of the tie bar, each fork head having two fork head holes for purposes of accommodating a bolt, and a spacing between the fork heads that can be continuously adjusted,
 the fork head holes of at least one fork head having a captive bushing for purposes of sound and vibration decoupling,
 wherein each bushing has a hollow cylindrical base body having a shank with a peripheral annular bead in at least some sections disposed approximately on the central region of the shank height of the base body such that the peripheral bead causes a snapping into place of the bushing into the fork head holes, and
 a structure fitting disposed between the fork heads and retained between the bushings, the structure fitting having cooperating arcuate surfaces, wherein a relative movement between the arcuate surfaces allows an angular displacement between the structure fitting and the associated fork head.

2. The tie bar in accordance with claim 1, wherein the base body of each bushing has at least two axial slots.

3. The tie bar in accordance with claim 1, wherein an external diameter of the base body of each bushing is at least slightly larger than an internal diameter of the fork head holes.

4. The tie bar in accordance with claim 1, wherein the bolts in the fork head holes of the fork heads, are secured in their location by a securement device.

5. The tie bar in accordance with claim 4, wherein the securement device comprises a spring cotter pin.

6. The tie bar in accordance with claim 1, wherein between the structure fitting and the associated fork head, and also between the equipment fitting and the associated fork head, an angular displacement of up to 5° is possible.

7. The tie bar in accordance with claim 1, wherein the bushings, for purposes of sound and vibration decoupling, are formed from a vibration-attenuating material.

8. The tie bar in accordance with claim 7, wherein the bushings are formed from a material chosen from the group consisting of a thermoplastic plastic material, a thermosetting plastic material, a rubbery-elastic plastic material and a combination of at least two of the listed plastic materials.

9. The tie bar in accordance with claim 1, wherein each bushing comprises a flange disposed on a first side of the at least one fork head having a flange diameter significantly larger than an internal diameter of a corresponding fork head hole wherein the captive bushing cannot migrate through the corresponding fork head hole, a shank passing through the corresponding fork head hole, and a peripheral bead disposed on the shank on a second side of the at least one fork head opposite the first side wherein an external diameter of the shank through the bead is greater than a diameter of the hole and less than the flange diameter such that the shank and the bead can be press fit through the corresponding hole.

10. The tie bar in accordance with claim 9, wherein the bead has a cross-sectional geometry that is approximately a segment of a circle in shape.

11. The tie bar in accordance with claim 9, wherein a bead spacing between the flange and the bead approximately corresponds to a material thickness of the fork heads in a region of the fork head holes.

* * * * *